United States Patent Office 3,097,215
Patented July 9, 1963

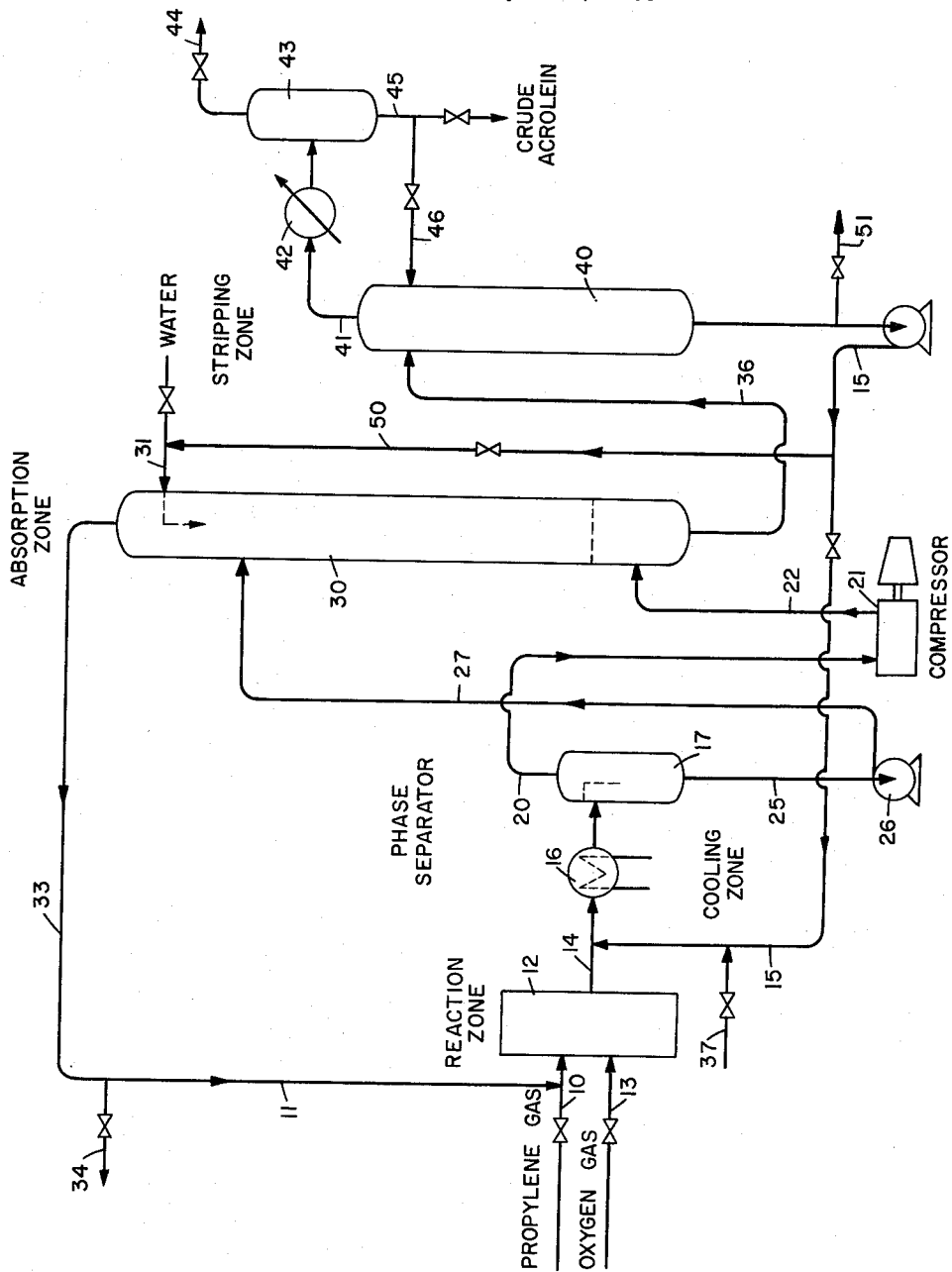

3,097,215
RECOVERY OF HYDROCARBON OXIDATION
PRODUCTS
Martin L. Courter, Walnut Creek, Calif., and David S. Thayer, Cheshire, Conn., assignors to Shell Oil Company, New York, N.Y., a corporation of Delaware
Filed Apr. 8, 1960, Ser. No. 21,003
5 Claims. (Cl. 260—348)

This invention relates to the recovery of highly reactive hydrocarbon oxidation products possessing appreciable volatility from mixtures comprising them obtained by the controlled catalytic oxidation of hydrocarbons. The invention relates more particularly to the recovery of highly reactive hydrocarbon oxidation products having from two to four carbon atoms to the molecule from reaction mixtures containing them obtained by the controlled catalytic oxidation with molecular oxygen of the corresponding olefinic hydrocarbons.

Highly reactive hydrocarbon oxidation products such as, for example, ethylene oxide, acrolein and methacrolein, are obtained by controlled catalytic oxidation of the corresponding olefinic hydrocarbons with molecular oxygen. The execution of these processes under controlled oxidation conditions leading to the formation of the desired oxygen-containing compounds generally results in the obtaining of an effluence from the reaction zone consisting predominantly of uncondensed normally gaseous reactants and fixed gas, and will contain the desired oxygen-containing compounds in relatively minor amount. Thus, in the production of acrolein or methacrolein by the catalytic oxidation of propylene or isobutylene, respectively, with an oxygen-containing gas there is obtained a reaction zone effluence consisting predominantly of unconverted olefinic reactant, oxides of carbon, unreacted oxygen, inert gases, etc., which will contain the desired carbonylic compounds in relatively minor amount. Similarly, in the production of ethylene oxide by the controlled catalytic oxidation with molecular oxygen of ethylene the reactor effluence will consist predominantly of normally gaseous materials comprising ethylene, oxides of carbon, inert gases, oxygen, etc., and will contain relatively small amounts of ethylene oxide. The ability to recover efficiently at least a substantial proportion of the desired oxygen-containing compounds from such mixtures comprising normally gaseous materials in substantial excess often contributes materially to the determination of the practicality of the process.

In processes disclosed heretofore, these oxygenated compounds are generally recovered from reaction zone effluence by direct contact with a stream of liquid solvent, such as, for example, water, in a suitable scrubbing or extraction zone. As a consequence of the exceedingly large amount of normally gaseous materials generally present in the reactor effluence, exceedingly large amounts of water must be introduced into the absorption zone in methods disclosed heretofore if at least a substantial proportion of the desired oxygenated compounds is to be absorbed into the aqueous solvent. The very considerable amounts of water thus of necessity employed in such recovery processes disclosed heretofore, and the correspondingly large scale of equipment required therefor, contribute materially to the cost of the process. A process enabling the recovery of the desired oxygen-containing compounds from the reaction zone effluence, wherein the amount of aqueous absorbent necessary to effect substantially complete recovery of the desired oxygen-containing compounds can be materially reduced, is therefore greatly desired.

It is, therefore, an object of the present invention to provide an improved process enabling the more efficient recovery of highly reactive hydrocarbon oxidation products having from two to four carbon atoms from reaction mixtures obtained by catalytic oxidation of the corresponding olefinic hydrocarbons with a molecular oxygen-containing gas.

Still another object of the invention is to provide an improved process enabling the more efficient separation of ethylene oxide from reaction mixtures obtained by controlled catalytic oxidation of ethylene-containing hydrocarbons.

Another object of the invention is the provision of an improved process enabling the more efficient separation of alpha,beta-unsaturated aliphatic aldehydes having from three to four carbon atoms to the molecule from reaction mixtures obtained by controlled catalytic oxidation with molecular oxygen-containing gas of the corresponding olefinic hydrocarbons.

A particular object of the invention is the provision of an improved process enabling the more efficient recovery of acrolein from reaction mixtures obtained by catalytic oxidation of propylene with a molecular oxygen-containing gas. Other objects and advantages of the invention will become apparent from the following detailed description thereof made with reference to the attached drawing wherein the single FIGURE illustrates more or less diagrammatically one form of apparatus suitable for carrying out the process of the invention.

It has now been found that substantially complete recovery of the desired oxygen-containing oxidation products is obtained with a substantial reduction in the amount of absorbent, and consequently of the size of the equipment, required by employing a novel and improved method wherein an oxygenated hydrocarbon-lean product condensate, obtained within the system, is used as an intermediate liquid absorbent for the desired oxygen-containing oxidation products.

In accordance with the present invention water soluble, highly reactive hydrocarbon oxidation products, possessing appreciable volatility and containing from two to four carbon atoms to the molecule, are recovered from reaction mixtures comprising them in admixture with unconverted normally gaseous reactants and fixed gases, obtained by controlled catalytic oxidation of corresponding olefinic hydrocarbons, by steps comprising (1) cooling the reaction mixture in the presence of water, thereby forming a liquid phase comprising water and a part of said hydrocarbon oxidation products and a vapor phase comprising a part of said hydrocarbon oxidation products and water; (2) compressing said vapor phase to a higher pressure; (3) subjecting said vapor phase, after said compression, to direct countercurrent contact with said liquid phase in an absorption zone; (4) introducing liquid aqueous solvent as a separate stream into said absorption zone; and (5) distilling said hydrocarbon oxidation products from the resulting rich aqueous absorbate.

The invention is applied to the recovery of highly reactive hydrocarbon oxidation products possessing appreciable volatility and characterized by ability to react readily with water, from reaction mixtures comprising them in admixture with substantial amounts of normally gaseous olefinic hydrocarbons and/or fixed gases. The invention is applied with particular advantage to the recovery of highly reactive hydrocarbon oxidation products having from two to four carbon atoms to the molecule from the total reaction mixtures obtained by the catalytic oxidation with molecular oxygen-containing gas of the corresponding olefinic hydrocarbons. The invention enables the more efficient recovery of ethylene oxide from the total reaction mixtures comprising ethylene oxide in admixture with unconverted ethylene, oxides of carbon and inert gas obtained by the silver-catalyzed controlled oxidation of ethylene with molecular oxygen. Another application of the invention is in the efficient recovery of acrolein and methacrolein from the reaction mixtures obtained by the catalytic oxidation with molecular oxygen of the corresponding olefins. Oxidation processes producing acrolein- and methacrolein-containing reaction mixtures to the resolution of which the process of the invention is applied with advantage comprise that disclosed in U.S. Patent No. 2,451,485. It is to be pointed out that the invention is not limited in its application to the recovery of these carbonylic compounds from reaction mixtures obtained only in certain specific oxidation processes, but may be applied broadly to the recovery of these carbonylic products from reaction mixtures comprising them obtained by any of the known processes wherein these carbonylic compounds are produced by the controlled catalytic oxidation of the corresponding hydrocarbons with molecular oxygen, or a gas providing molecular oxygen.

In order to set forth more clearly the nature of the invention it will be described herein in its application to the recovery of acrolein from acrolein-containing reaction mixtures obtained by controlled catalytic oxidation of propylene with molecular oxygen, with reference to the attached drawing.

Referring to the drawing; molecular gaseous hydrocarbons comprising propylene are passed from an outside source through valved line 10 into a suitable reaction zone indicated in the drawing by the box 12. An oxygen containing gas, for example air, emanating from an outside source is introduced into reaction zone 12 through valved line 13. Within reaction zone 12, the propylene-containing hydrocarbons in admixture with the oxygen, or oxygen-containing gas, are contacted with a suitable oxidation catalyst under hydrocarbon oxidizing conditions resulting in the interaction of propylene and oxygen with the formation of reaction products comprising acrolein. As indicated above, the process of the invention is not limited in its application to the use of specific oxidation conditions within reaction zone 12. Suitable propylene oxidation conditions comprise those disclosed heretofore as suitable for the catalytic conversion of propylene to acrolein. Such suitable catalytic propylene oxidation conditions comprise those set forth in U.S. Patent No. 2,451,485.

Oxidation of the propylene-containing hydrocarbon within reaction zone 12 will result in the obtaining of a reaction mixture containing not only acrolein, but other normally gaseous constituents such as, for example, normally gaseous hydrocarbons comprising unconverted propylene, oxides of carbon, fixed gases such as, for example, nitrogen, and the like, introduced together with the oxygen-containing gas, etc. In general, the effluence from the reaction zone will consist predominantly of propylene, nitrogen, carbon dioxide, carbon monoxide and oxygen. Practical scale operation of the process necessitates not only the efficient separation of the desired acrolein from the reaction zone effluence, but the recycling of the unconverted hydrocarbons to the reaction zone. In accordance with the invention the total reaction zone effluence is passed from reaction zone 12 through line 14, provided with suitable cooling means such as, for example, an indirect heat exchanger 16, into a phase separating zone, for example, chamber 17. In passing through exchanger 16 the reaction zone effluence is cooled. Such cooling is effected in the presence of water. The amount of water present in the reaction zone effluence passed into chamber 17 may vary considerably within the scope of the invention, thus the amount of water in line 14 may range from about 1 to about 150, and preferably from about 10 to about 80 moles of water per mole of acrolein present in the reaction zone effluence. The presence of a sufficient amount of water may be assured by the introduction of water into line 14 by means of valved line 15. Often the oxidation reaction carried out in reaction zone 12 is executed in the presence of added water; and/or water may be formed in the process. In such a case the amount of water introduced through line 15, into line 14, is controlled to supply only the additional amount of water required to execute the desired operation. At times the amount of water in the reaction zone effluence may be sufficient to preclude the addition of further amounts of water to line 14.

When adding water to line 14 by means of line 15 such water addition contributes to the desired cooling of the reaction zone effluence before its passage into chamber 17. In passing through heat exchanger 16 the reaction zone effluence is cooled to a temperature sufficiently low to assure the separation of a liquid phase comprising acrolein and water, from a vapor phase comprising acrolein and normally gaseous constituents including normally gaseous hydrocarbons comprising propylene and fixed gases.

The vapor phase is passed from chamber 17, through line 20, to a compressor 21 wherein it is compressed to a higher pressure than that prevailing in chamber 17. The compressed vapor phase is passed from compressor 21, through line 22, into an absorption zone comprising, for example, a column 30. Liquid phase is taken from chamber 17, through line 25, and forced, by means of pump 26 through line 27, into column 30. The liquid stream flowing through line 27 is introduced into column 30 at a point above that at which the compressed vapor phase emanating through line 22 enters column 30. Water is introduced into the upper part of column 30 through valved line 31. Within column 30 the vapor phase separated in chamber 17 is therefore brought, after compression, into direct countercurrent contact with the liquid phase separated in chamber 17. Column 30 is maintained under a pressure which is appreciably higher than that maintained within chamber 17. As a consequence of the compression of the vapor phase taken from chamber 17 before its introduction into column 30, the compressed vapor phase will no longer be in equilibrium with the liquid phase emanating from chamber 17 through lines 25 and 27. Consequently, the liquid phase introduced into column 30 through line 27 is now capable of functioning as auxiliary solvent capable of selectively dissolving a substantial portion of the acrolein introduced into column 30 through line 22. Selective absorption of acrolein entering column 30 through line 22 in the countercurrently flowing stream of liquid results in the formation within column 30 of a liquid phase comprising acrolein and water and a vapor phase comprising unconverted hydrocarbons including propylene and fixed gases including nitrogen, oxides of carbon, and unconverted oxygen. As a consequence of such a combination of steps comprising the initial compression of the vapor phase emanating from chamber 17 before its introduction into column 30, and the introduction of the liquid phase from chamber 17 into column 30 as absorbent, the amount of water to be introduced through line 31 to effect substantially complete recovery of acrolein in the liquid phase formed in column 30, is substantially reduced. This, in turn, reduces the size, and consequently initial and operative costs of equipment to which the rich absorbate is sent for further processing.

By proceeding in the above described manner in accordance with the invention, the amount of water which need generally be introduced into the upper part of column 30 through line 31 to obtain substantially complete retention of acrolein in the liquid phase formed within column 30, will generally constitute only about one-half of that required in operations wherein only the vapor phase from chamber 17 is passed into the absorption zone. In view of the substantial amounts of water generally employed in executing the recovery of the desired carbonylic products in the absorption zone, this represents a very considerable reduction in the cost of operating the process.

In the foregoing detailed illustrative description of the invention, a single phase separator, chamber 17, is shown as the phase separating zone of the process. It is to be understood that a plurality of phase separators, arranged in the parallel or series flow may be used within the scope of the invention. If desired, a part of the liquid phase separated in the phase separating zone may be sent directly into the stripping column 40 and the rest passed to the absorption column 30. For the purpose of clarity parts of apparatus such as pumps, valves, etc., not essential to a complete understanding of the invention have been omitted from the drawing.

Vapor phase, comprising unconverted hydrocarbons including propylene and fixed gases comprising nitrogen, oxides of carbon and the like, is taken from the upper part of column 30 and passed, at least in part, through lines 33 and 11, into line 10 entering reaction zone 12. A valved line 34 is provided for bleeding a part of the gases recycled through line 33 from the system. Liquid phase, comprising water and absorbed acrolein, is passed from column 30 through line 36 into a suitable distillation zone comprising, for example, a distillation column 40. Within column 40, a vapor phase consisting essentially of acrolein is separated from a liquid phase consisting essentially of water. The vapor phase comprising acrolein is passed overhead from column 40, through line 41, provided with cooling means 42, into accumulator 43. Liquid condensate consisting essentially of acrolein is eliminated from accumulator 43 through valved line 45 as the final product. Accumulator 43 is provided with valved line 44 to enable the bleeding of gaseous materials therefrom. A part of the liquid condensate passing through valved line 45 is returned to the top of column 40 as reflux by means of valve line 46. Liquid phase, consisting essentially of water, is removed from the lower part of the distillation column 40 and passed through lines 15 and 50 into line 31 discharging into the upper part of column 30. When water is introduced into line 14 as described herein above, at least a part of such water may be that emanating from column 40 through line 15. A valved line 37 is provided for the introduction of make-up water from an outside source into line 15 as required. The following example is illustrative of the process of the invention. A valved line 51 is provided for bleeding a part of the lean aqueous absorbate from the system as required.

*Example I*

A reaction mixture obtained by the controlled catalytic oxidation of propylene with molecular oxygen, in the vapor phase, in the presence of a cuprous oxide catalyst, after quenching with water, consisted essentially of 2.6% acrolein, 34.2% of propylene and propane, 0.8% oxygen, 19.4% fixed gases and 43% of water. The mixture was cooled from a temperature of 300° F. to a temperature of about 120° F. in two stages. During the cooling operation two separate liquid condensate fractions were separated from the reaction mixture. The first liquid condensate fraction contained 8.8% of the acrolein and 76% of the water in the total quenched reaction mixture. The second liquid condensate fraction contained 4.2% of the acrolein and 13% of the water content of the total quenched reaction mixture. The remaining vapor phase contained 87% of the acrolein and 1.3% of the water, as well as the normally gaseous hydrocarbons and fixed gas, present in the total reaction mixture. The vapor phase which, after the cooling, was at a pressure of about 80 p.s.i.a. was compressed to a pressure of 300 p.s.i.a., and thereafter introduced into the lower part of an absorption column into the top of which a liquid stream of water was introduced. The first liquid condensate fraction separated during the cooling of the reaction mixture was introduced into the absorption column at a point intermediate the point of introduction of the water and that of the compressed vapor phase. The absorption column was maintained at a pressure of about 300 p.s.i.a. and a temperature of 70° F. Within the absorption column acrolein was selectively absorbed in the aqueous solvent with the formation of a rich absorbate consisting essentially of water and acrolein containing approximately 50.1 mols of water per mol of acrolein. The gaseous overhead from the absorption column consisting essentially of propylene, propane, and fixed gases, was passed to a propylene recovery unit. Rich absorbate is removed from the lower part of the absorption column and distilled together with the second liquid condensate fraction formed in the process. Overhead from the distillation consisted essentially of acrolein containing a relatively small amount of water. More than 99% of the acrolein in the reaction mixture subjected to the recovery operation was recovered as overhead in the distillation. Aqueous bottoms remaining after the distillation were returned in part to the absorption column. 17.6 mols of water were introduced into the upper part of the absorption column for each mol of acrolein recovered as distillation overhead.

When carrying out the operation under substantially identical conditions but with the exception that the vapor phase was sent to the absorption column without compression and both of the liquid condensate fractions produced during the cooling operation were sent directly to the distillation zone wherein the rich absorbate is distilled, necessitates the addition of 35.2 mols of water to the upper part of the absorption column per mol of acrolein recovered as distillation overhead in order to obtain equivalent acrolein recovery. The amount of water which must be introduced into the upper part of the absorption column when proceeding in accordance with the prior art method is, therefore, about twice the amount so used in the process in accordance with the invention.

*Example II*

An acrolein-containing reaction mixture obtained by the cuprous oxide-catalyzed, vapor phase, controlled oxidation of propylene with molecular oxygen, contained 2% acrolein, 34% normally gaseous hydrocarbons comprising propylene and 52% water. The rest of the reaction mixture consisted essentially of fixed gas. The reaction mixture was cooled in a single stage cooling operation from the reactor outlet temperature to about 65° F.; thereby separating a vapor phase containing 1.8% acrolein, 0.6% water and 71.5% normally gaseous hydrocarbons comprising propylene, the rest of the vapor phase so separated consisting essentially of fixed gases, from a liquid condensate phase consisting essentially of aqueous acrolein containing 97 mols of water for each 1.8 mols of acrolein. The vapor phase was compressed from a pressure of 53 p.s.i.g. to a pressure of 110 p.s.i.g. and introduced into an absorption column. The liquid condensate phase formed during the cooling operation was introduced into the absorption column as absorbent liquid. Sufficient water was separately introduced into the upper part of the absorption column to assure the absorption of acrolein in the liquid phase in the absorption column. Rich absorbate so formed in the absorption column consisted essentially of aqueous acrolein contaning 1.6 mols of acrolein for each 97.6 mols of water. The overhead from the absorption column consisted essentially of normally gaseous hydrocarbons and fixed gases, containing only a trace of acrolein. Acrolein was distilled from the rich absorbate taken from the lower part of the absorption column. In this manner 99.5% of the acrolein in the reaction mixture charged to the process was recovered as overhead in the distillation operation. During the course of the operation 31.1 mols of water were introduced into the top of the absorption column for each mol of acrolein recovered as overhead in the distillation operation.

When repeating the operation under substantially identical conditions in the same equipment, but with the exception that the vapor phase obtained in the cooling operation was sent directly to the absorption column without compressing, and the liquid condensate phase which was formed in the cooling operation was sent directly to the distillation column wherein the rich absorbate was distilled, the amount of water which had to be introduced into the top of the absorption column to obtain a recovery of at least 99% of the acrolein amounted to 62.9 mols of water per mol of acrolein recovered as overhead in the distillation operation. This is about twice the amount of water required for this purpose when proceeding in accordance with the invention.

We claim as our invention:

1. In a process for separating a water-soluble, highly reactive hydrocarbon oxidation product selected from the group consisting of acrolein and methacrolein from a reaction mixture obtained by the catalytic oxidation with molecular oxygen of the olefinic hydrocarbon corresponding to said hydrocarbon oxidation product, said reaction mixture comprising said hydrocarbon oxidation product in admixture with normally gaseous hydrocarbons and inert gas, in which process said hydrocarbon oxidation product is separated from said reaction mixture by selective absorption in a liquid aqueous solvent in an absorption zone, and said hydrocarbon oxidation product is distilled from the resulting rich aqueous absorbate formed in said absorption zone, the steps which comprise cooling said reaction mixture in the presence of water, thereby forming a liquid condensate phase comprising a part of said hydrocarbon oxidation product and water and a vapor phase comprising the rest of said hydrocarbon oxidation product in admixture with said normally gaseous hydrocarbons and said inert gas, compressing said vapor phase to a higher pressure than that maintained during said cooling, introducing said vapor phase after said compression into said absorption zone, maintaining a higher pressure in said absorption zone than in said cooling zone, and separately introducing at least a part of said condensate phase as absorption liquid into said absorption zone.

2. The process in accordance with claim 1 wherein said reaction mixture is cooled in at least two successive stages thereby forming at least two separate liquid condensate fractions, passing one of said liquid condensate fractions to said absorption zone, and distilling another of said liquid condensate fractions together with said rich absorbate.

3. The process is accordance with claim 1 wherein a part of the aqueous solvent remaining as distillation residue after distilling said hydrocarbon oxidation product from said rich absorbate is combined, as quench, with said reaction mixture prior to said cooling operation.

4. In a process for separating acrolein from a reaction mixture, obtained by the catalytic oxidation with molecular oxygen of propylene, said reaction mixture containing said acrolein in admixture with normally gaseous hydrocarbons and inert gas, in which process acrolein is separated from said reaction mixture by selective absorption in water in an absorption zone, and acrolein is distilled from the resulting acrolein-rich absorbate, the steps which comprise cooling said reaction mixture by indirect heat exchange in the presence of water in a cooling zone, thereby separating a liquid condensate phase comprising acrolein and water from a vapor phase comprising acrolein in admixture with said normally gaseous hydrocarbons and said inert gas in said cooling zone, compressing said vapor phase to a higher pressure that that maintained in said cooling zone, introducing said vapor phase after said compression into said absorption zone, maintaining a higher pressure in said absorption zone than in said cooling zone, and separately introducing said liquid condensate phase as absorption liquid into said absorption zone.

5. In a process for separating methacrolein from a reaction mixture obtained by the catalytic oxidation with molecular oxygen of isobutylene, said reaction mixture containing said methacrolein in admixture with normally gaseous hydrocarbons and inert gas, in which process methacrolein is separated from said reaction mixture by selective absorption in water in an absorption zone, and methacrolein is distilled from the resulting methacrolein-rich absorbate, the steps which comprise cooling said reaction mixture by indirect heat exchange in the presence of water in a cooling zone, thereby separating a liquid condensate phase comprising a part of said methacrolein and water from a vapor phase comprising the rest of said methacrolein in admixture with said normally gaseous hydrocarbons and said fixed gas in said cooling zone, compressing said vapor phase to a higher pressure than that maintained in said cooling zone, introducing said vapor phase after said compression into said absorption zone, maintaining a higher pressure in said absorption zone than in said cooling zone, and separately introducing said liquid condensate phase as absorption liquid into said absorption zone.

References Cited in the file of this patent

UNITED STATES PATENTS

| | | |
|---|---|---|
| 2,135,271 | Balcar | Nov. 1, 1938 |
| 2,514,968 | Dunn | July 11, 1950 |
| 2,606,933 | Cole et al. | Aug. 12, 1952 |
| 2,725,344 | Fenske et al. | Nov. 29, 1955 |
| 2,750,398 | Courter et al. | June 12, 1956 |
| 2,775,600 | Maslan | Dec. 25, 1956 |

FOREIGN PATENTS

| | | |
|---|---|---|
| 623,583 | Great Britain | May 19, 1949 |
| 772,145 | Great Britain | Apr. 10, 1957 |